United States Patent [19]

Achille et al.

[11] Patent Number: 4,731,504

[45] Date of Patent: Mar. 15, 1988

[54] MULTI-LAYER FILM STRUCTURE AND ELECTRICAL CABLE INCORPORATING SAME

[75] Inventors: Felix Achille, Reynoldsburg; Daniel G. Pikula, Colombus; Patricia B. Leng, Newark, all of Ohio

[73] Assignee: The Dow Chemical Company, Midland, Mich.

[21] Appl. No.: 895,969

[22] Filed: Aug. 13, 1986

[51] Int. Cl.[4] .................... H01B 7/34; B32B 7/04; B32B 27/08

[52] U.S. Cl. .................... 174/107; 174/105 R; 428/383; 428/420; 428/516; 428/518

[58] Field of Search .................... 174/107, 105 R; 428/383, 420, 516, 518

[56] References Cited

U.S. PATENT DOCUMENTS

| | | | |
|---|---|---|---|
| 3,467,569 | 9/1969 | Weber et al. | 428/518 X |
| 3,681,515 | 8/1972 | Mildner | 174/116 X |
| 4,004,077 | 1/1977 | Woytiuk | 174/23 C |
| 4,132,857 | 1/1979 | Scarola et al. | 428/516 X |
| 4,269,321 | 5/1981 | Ichinose et al. | 428/516 X |
| 4,292,463 | 9/1981 | Bow et al. | 428/383 X |
| 4,308,416 | 12/1981 | Herman et al. | 174/23 C |
| 4,351,931 | 9/1982 | Armitage | 428/461 X |
| 4,449,014 | 5/1984 | Brezinsky | 428/383 X |
| 4,487,641 | 12/1984 | Bohannon, Jr. et al. | 174/105 R X |
| 4,501,928 | 2/1985 | Ishitobi | 174/107 |
| 4,623,587 | 11/1986 | Ito et al. | 428/516 X |

FOREIGN PATENT DOCUMENTS 165427 of 0000 Japan .
WO85/01294 3/1985 PCT Int'l Appl. .

Primary Examiner—Morris H. Nimmo

[57] ABSTRACT

A multi-layered adhesive composition particularly suited for adhesion between metallic substrates and vinyl chloride polymer resins particularly highly plasticized vinyl chloride polymer resins comprising a metal adherent layer, an intermediate layer and a vinyl chloride polymer adherent layer.

7 Claims, 2 Drawing Figures

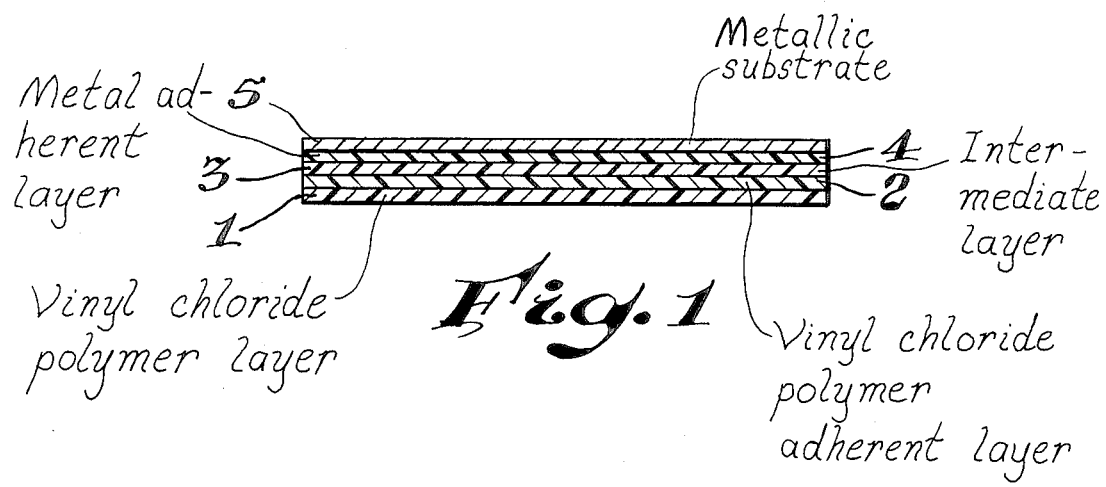
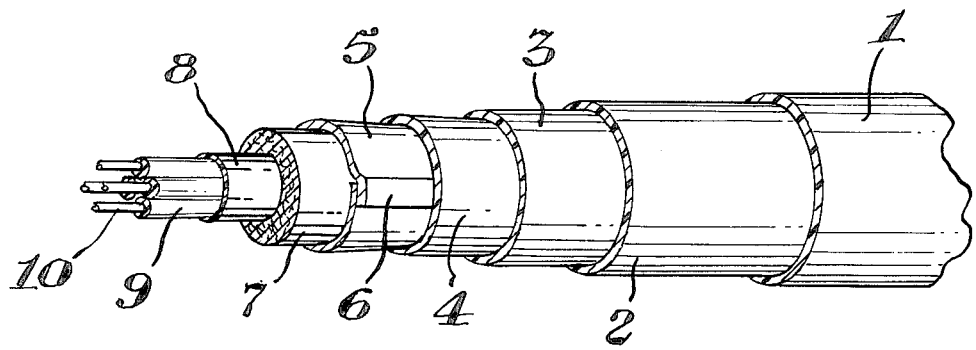

MULTI-LAYER FILM STRUCTURE AND ELECTRICAL CABLE INCORPORATING SAME

BACKGROUND OF THE INVENTION

The present invention relates to metallic substrates having coated thereon a multiple layer coating. More particularly, the present invention relates to such metallic substrates having a multiple layer coating of polymers desirably selected to provide adhesion between the metallic substrate and a subsequently applied layer of a vinyl chloride polymer. In one embodiment, the invention is further directed to an electrical cable, particularly a communications cable, comprising the multi-layer coated metallic substrate in the form of a sheath system, and, optionally, further comprising a water absorbing composition therein.

Polymers of vinyl chloride such as polyvinyl chloride homopolymers or copolymers of vinyl chloride and other copolymerizable monomers such as methyl methacrylate are desirably employed in the preparation of insulating jacketing resins for use in communications cables and other electrical wiring due to the inherent resistance to burning, ready availability, and low cost of such polymers. Suitable resins additionally comprise large percentages of known plasticizing compounds in order to impart desired flexibility to such resins. Because of the large amount of such plasticizing compounds vinyl chloride polymer jacketing resins are particularly difficult to bond to other substrates, especially metallic substrates.

Communications cables desirably include in their construction a sheath structure normally provided in the form of a thin metallic strip which is folded circumferentially around centrally disposed conductors and overlapped or otherwise suitably joined to form a substantially cylindrical structure. Such sheath systems may further be corrugated to provide greater flexibility. The sheath system provides mechanical integrity to the resulting cable, as well as electromagnetic shielding and physical protection to the inner wires and bonding to ground for protection from lightning strikes. Suitable metals for such sheath systems include aluminum, copper, steel, lead, stainless steel, and coated varieties of stainless steel such as copper or chrome coated stainless steel.

It is previously known in the art to prepare coated metal substrates, particularly strips coated with one or more polymeric layers to provide a sheath system for use in cable constructions. Coatings of copolymers of ethylene and an ethylenically unsaturated carboxylic acid such as acrylic acid are disclosed in U.S. Pat. No. 3,681,515. Additional polymers suitable for coating metals comprising high molecular weight uniformly random copolymers of ethylene and acrylic or methacrylic acids have been disclosed in U.S. Pat. No. 4,351,931.

Multiple polymer coatings for use in bonded sheath containing cables are disclosed in U.S. Pat. No. 4,487,641. In this reference, coatings comprising a first adhesive material which is bondable to the metallic layer and a second adhesive material which is bondable to the extruded jacketing resin are employed, See Col. 6, lines 53–65. A similar structure is disclosed in U.S. Pat. No. 4,449,014.

Copolymers of ethylene and carbon monoxide and, optionally, additional copolymerizable comonomers such as vinyl acetate are previously known in the art. In PCT Application No. 85 1294 such olefin polymers are disclosed for use as heatable high frequency electromagnetic radiation receptors. Adhesion of such polymers to polyvinyl chloride and polyvinylidene chloride polymers is disclosed.

In Japanese Kokai No. 57-165,427, copolymers of ethylene, carbon monoxide and vinyl acetate are disclosed which are useful adhesives for laminating polyvinyl chloride substrates including substrates which are highly plasticized, for example, with dioctyl pththalate.

Thus, it is previously known in the art to prepare two layered adhesive laminates useful for adhesion to metals on the one hand and polyolefin jacketing resins on the other hand. In addition, it is previously known that copolymers of ethylene and carbon monoxides may be adhesively joined to polyvinyl chloride resins. However, a problem still exists in the art in obtaining adhesion between the single or multiple layer adhesive laminates usefully adhered to metal substrates and the ethylene carbon monoxide containing copolymers usefully adhered to vinyl chloride polymer resins, and in particular, obtaining adhesion in such a structure to such vinyl chloride polymer resins that additionally comprise large quantities of a plasticizer. Accordingly, there remains a difficulty in the art in obtaining a cable construction comprising a metallic sheath in combination with a highly plasticized polyvinyl chloride jacketing resin.

An additional problem encountered in the field of communications cables is the need or requirement that the cable jacketing layer be easily removable for installation of grounding connectors yet retain sufficient adhesion to the underlying shielding tape assembly that abrasion or stretching forces encountered in shipping and installing not damage the cable structure causing delamination of the polyvinyl chloride jacketing resin.

Finally, due to exposure of communications cables to moist environments and even to standing water it is desirable to provide a communications cable which provides improved resistance to water permeation and longitudinal water travel within the cable such as might occur should the jacketing and/or the protective sheath assembly become abraded or severed thereby exposing the inner conductor assembly to water optionally at an elevated hydrodynamic pressure.

SUMMARY OF THE INVENTION

According to the present invention there is now provided a multiple layer adhesive coating for application to metallic substrates which may be suitably employed to adhere such metallic substrate to a polymer of vinyl chloride. More particularly, the multiple layer adhesive coating of the present invention is usefully employed in obtaining adhesion between such metallic substrate and a highly plasticized polymer of vinyl chloride. The multiple layer adhesive coating of the present invention comprises a metal adherent layer, an intermediate layer, and a vinyl chloride polymer adherent layer.

In one embodiment of the invention, the multi-layer coating is employed to adhere a metallic substrate to a vinyl chloride polymer by interposing the multi-layer coating of the invention between the metallic substrate and the vinyl chloride polymer layer such that the metal adherent layer is adjacent the metal substrate and the vinyl chloride polymer adherent layer is adjacent the vinyl chloride polymer layer.

In a further embodiment of the invention, there is provided a communication cable comprising an outer jacket comprising a vinyl chloride polymer, and a metallic sheath assembly surrounding an inner conductor means, the metallic sheath assembly being adhered to the vinyl chloride polymer outer jacket by means of a multi-layer coating comprising a metal adherent layer an interlayer and a vinyl chloride polymer adherent layer.

In a final embodiment of the invention, the inner conductor means comprises one or more conductors each containing a coating of an insulating jacketing resin, optionally a surrounding inner jacket comprising an olefin or a vinyl chloride polymer resin, a water absorbable substrate layer, a metallic sheath and an outer jacket of a vinyl chloride polymer resin, the sheath being adhered to the outer jacket by means of a multi-layer coating comprising a metal adhesive layer an intermediate layer and a vinyl chloride polymer adhesive layer.

BRIEF DESCRIPTION OF THE DRAWING

In FIG. 1 there is illustrated the multilayer coating of the present invention adhered to a metallic substrate on one hand and to a vinyl chloride polymer substrate on the other. The various components so illustrated include a vinyl chloride polymer layer, 1, vinyl chloride polymer adherent layer, 2, an intermediate layer, 3, a metal adherent layer, 4, and a metallic substrate, 5.

In FIG. 2, there is illustrated a cable construction utilizing the multi-layer adhesive structure of the present invention to adhere the vinyl chloride polymer jacketing resin to a metallic sheath and also illustrating the use of the optional water absorbable layer between the sheath and the inner conductor assembly. Accordingly, there is provided an outer jacket of a vinyl chloride polymer, 1, a vinyl chloride polymer adherent layer, 2, an interlayer, 3, a metal adherent layer, 4, a metal shield, 5, which is folded longitudinally upon itself and optionally sealed to produce an overlap seam, 6, a water absorbable layer, 7, surrounding a conductor assembly having an insulating layer, 8, and inner conductor means, 9, which may include one or more conductors, 10.

DETAILED DESCRIPTION OF THE INVENTION

Vinyl chloride polymer resins usefully adhered to metallic substrates by use of the present invention include homopolymers and copolymers of vinyl chloride containing up to about 40 percent by weight of a copolymerizable comonomer. Suitably copolymerizable comonomers include the alkyl acrylates and methacrylates, containing up to about 6 carbon atoms in the alkyl group, vinyl acetate, etc. Additional polymeric compounds may be blended with the vinyl chloride polymer also in amounts up to about 40 percent by weight. Suitable polymeric compositions usefully blended with the vinyl chloride polymer include chlorinated polyethylene, fluorinated polymers, and elastomers such as rubbery polymers of diolefins, copolymers of ethylene and propylene, copolymers of ethylene, propylene and a copolymerizable nonconjugated diene, and functionalized or grafted derivatives thereof.

For particular use as a jacketing resin, greater flexibility in the vinyl chloride polymer resin may be imparted by the use of plasticizers. Examples of suitable plasticizers include the phthalates such as dioctyl phthalate, dinonyl phthalate, diisodecyl phthalate and dibutyl phthalate, trimellitates such as tri-2-ethylhexyl trimellitate and triisooctyl trimellitate, phosphates such as tricresyl phosphate, trioctyl phosphate and triphenyl phosphate, adipates such as diisodecyl adipate and diisooctyl adipate, epoxidized oils prepared by epoxidizing soybean oil, rapeseed oil and like natural oils, fatty acid esters or chlorinated fatty acid esters such as butyl oleate or methyl tetrachlorostearate, tetrahydrophthalates such as di-n-octyl tetrahydrophthalate and diisodecyl tetrahydrophthalate, etc. The plasticizer is suitably employed in an amount of from about 5 to about 60 parts by weight, preferably 10 to 50 parts by weight per one hundred parts by weight of the jacketing resin.

The metal substrate is suitably selected from copper, aluminum, steel, lead, stainless steel, and coated stainless, steel such as copper or chromium/chrome oxide coated stainless, steel substrates.

The metal adherent layer suitably comprises a copolymer of ethylene and up to about 20 percent by weight, preferably up to about 10 percent by weight of a copolymerizable carboxy substituted comonomer. In addition, such copolymers may be further modified by reaction with a dicarboxylic acid anhydride in an amount up to about 10 percent by weight anhydride based on copolymer weight. Examples include the well known copolymers of ethylene and acrylic or methacrylic acid, particularly the homogeneous copolymers containing up to about 10 percent by weight of acrylic or methacrylic acid and such copolymers additionally containing in copolymerized form an ethylenically unsaturated carboxylic acid ester such as butyl acrylate. Such adhesive resins are particularly well suited for use with aluminum, steel or stainless steel substrates. Copolymers of ethylene and vinyl acetate and, in particular, such copolymers further modified by reaction with a reactive dicarboxylic acid anhydride such as maleic anhydride may also be employed. Suitably this latter class of copolymers are particularly adapted for adhesion to copper or copper coated stainless steel substrates.

The intermediate layer suitably comprises an adhesive polymer which is compatible with both the metal adhesive layer and the vinyl chloride polymer adhesive layer. Examples of suitable polymers for the intermediate layer include copolymers and interpolymers of ethylene and vinyl acetate and optionally a third copolymerizable comonomer containing from about 10 percent to about 40 percent by weight vinyl acetate and blends thereof with additional olefin polymers. Examples of suitable resins include CXA ® and Elvax ® brand resins available from E. I. duPont deNemour and Co. Additional suitable polymers include the carboxylic acid anhydride modified ethylene polymers and copolymers including blends thereof with additional polyolefin resins. Examples of the latter class of compounds include the family of resins known as Plexar ® resins available from Norchem Inc. A preferred copolymer of ethylene and vinyl acetate contains from about 20 percent, most preferably 25 percent, to about 35 percent vinyl acetate by weight.

The vinyl chloride polymer adherent layer of the multi-layer composition of the present invention comprises a copolymer of ethylene and carbon monoxide containing from about 5 percent to about 20 percent by weight carbon monoxide and, optionally, further containing in copolymerizable form one or more copolymerizable comonomers selected from the group consisting of ethylenically unsaturated carboxy-substituted comonomers. Particularly preferred vinyl chloride polymer adhesive copolymers include ethylene-carbon monoxide copolymers, ethylene-acrylic acid-carbon monoxide terpolymers and ethylene-vinyl acetate carbon monoxide terpolymers. The ethylenically unsaturated carboxy containing comonomer may be present in an amount up to about 30 percent based on total polymer weight.

The multi-layer adhesive coating of the present invention may be prepared by any suitable technique, but preferably is prepared by the multifeedblock cast coextrusion of the three polymer layers. Alternatively, the multi-layer adhesive film may be prepared by the technique of film blowing employing compressed air or mechanical techniques to expand a coextruded cylindrical shaped thin film. The cylinder may be slit to provide a resulting film of exceptional uniformity. The multi-layer coating may be separately prepared and later heat sealed to one or both substrates or may be coextruded directly into adhesive contact with one or more of the metal and/or vinyl polymer substrates.

In one embodiment of the invention, a metal substrate strip is coated on both sides with the multilayer coating thereby affording improved intercable adhesion where an inner conductor assembly has an insulating layer comprising a polymer of vinyl chloride.

A communications cable embodying a center conductor assembly, optionally comprising a coating of a polyolefin or polyvinyl chloride resin is prepared utilizing known procedures such as a cone former. A water absorbable layer is optionally applied over the outer coating of the conductor assembly and the metal strip having the multi-layer adhesive coating thereon is formed and optionally seamed into a cylindrical shape and, also optionally, corrugated to securely encapsulate the water absorbable layer leaving the adhesive layer exposed on the surface. A jacketing resin is extrusion coated over the metallic sheath and adhesively joined thereto in a final assembly by means of the three layer adhesive coating of the present invention.

In a preferred structure, the metallic sheath comprises copper, or copper coated stainless steel. The metal adherent layer comprises a maleic anhydride modified copolymer of ethylene and vinyl acetate containing from about 5 percent to about 10 percent vinyl acetate, the intermediate layer comprises a copolymer of ethylene and vinyl acetate containing from about 25 percent to about 30 percent vinyl acetate and the vinyl chloride polymer adherent layer comprises a copolymer of ethylene and carbon monoxide containing from about 5 percent to about 15 percent carbon monoxide.

The water absorbable layer, where employed, may be any suitable composition able to absorb and retain water. Typically, such compositions contain a polymer or copolymer of acrylamide monomer. Such compositions may be in the form of a powder or fiber such as a laminated, woven or nonwoven fabric structure. A suitable composition is known as Firet ® tape available from West Point Pepperell, Industrial Fabrics Division, West Point, Ga.

Most suitably, the communications cables according to the present invention are constructed so that the outermost vinyl chloride polymer layer may be removed for installation purposes. Suitably, the outer vinyl chloride polymer layer is adhered to the underlying metallic sheath sufficiently to prevent accidental delamination, but still remain removable by the use of normal techniques and tools. Preferably, an adhesion between the vinyl chloride polymer jacketing and the underlying vinyl chloride polymer adherent layer of from about 1.0 to about 10.0 pounds per inch width as tested according to 180° peel testing procedures (Rural Electrification Authority Test PE-39, bulletin 345-67) is desired. Control of adhesion to the vinyl chloride polymer layer may be obtained by adjustment of the amount of carbon monoxide monomer in the vinyl chloride polymer adherent layer. Improved stripability of the vinyl chloride polymer jacketing is obtained by employing the preferred range of carbon monoxide previously described.

It is desirable that the relatively thick jacketing be removable from the metallic sheath of the communications cable. However, it has been discovered that it is not necessary for the relatively thin adhesive layer which is interposed between the metallic sheath and the relatively thick polyvinyl chloride jacketing resin layer to be removed. During installation, electrical contact with the underlying metallic sheath for purposes of grounding etc. may be effected by use of a mechanical clamp or other device which has been found to puncture through the relatively thin adhesive layers remaining on the metallic substrate thereby effecting electrical contact.

Desirably, the multi-layer adhesive coating is relatively thin, on the order of 0.01 mm to about 0.5 mm in thickness and the vinyl chloride polymer jacketing is somewhat thicker on the order of 0.5 mm to 10 mm. Because grounding devices may readily accomodate the relatively thin coatings, i.e., clamping devices equipped with teeth to pierce the thin coating and make electrical contact with the underlying metal shielding, it is generally not required to remove the multi-layer coating as well as the vinyl chloride polymer jacket in order to make electrical connections utilizing cables according to the present invention.

It is further desirable that the completed communications cable satisfy certain requirements of water permeability. Most desirably, a cable structure such as that previously described suitably resists permeation of water through the cable in the direction coaxial with the conductors. Desirably, exposure of the severed end of a three foot section of cable to water having a head of approximately 3 feet, results in no permeation of water after 24 hours. Most preferably, no water permeation is observed in such a testing procedure after repeatedly heat cycling the cable between the temperatures of −40° C. and +60° C. over about a 30 hour period with a one hour residence time at each temperature and a total cycle time of three hours.

Having described the invention, the following examples are provided as further illustrative and are not to be construed as limiting.

SPECIFIC EMBODIMENTS

EXAMPLE 1

A multilayer film comprising a first layer of an ethylene/carbon monoxide copolymer having 10 percent carbon monoxide by weight, XU60766.02 available from The Dow Chemical Company, a second inner layer of ethylene/vinyl acetate copolymer, comprising 28 percent by weight vinyl acetate, ELVAX ® 3175, available from E. I. duPont deNemours Inc., and a third layer (vinyl chloride polymer adhesive layer) of a maleic anhydride graft modified ethylene/vinyl acetate copolymer, Plexar ®3, available from Norchem is prepared by a blown film process. The thickness of the three layers are 0.001 inches, 0.0004 inches and 0.0011 inches.

The film is laminated to one side of a copper alloy tape (0.025 inches thick, 3.0 inches width) by contacting with the previously heated metal tape (200° F.). A two-pair communications cable is prepared by longitudinally wrapping a water swellable tape (Firet ® brand tape) and the metal laminated tape having an exposed multi-layer film coating about a two-pair cable core. A polyvinyl chloride jacketing resin, 84G048A, available from Tehnor Apex Company, is pressure extruded over the outside of the construction and caused to adhere thereto by the heat of extrusion.

The resulting cable is aged for 48 hours at 60° C. Jacket adhesion value was 6.0 lbs/in indicating adequate but peelable jacket adhesion. The completed cable is thermal cycled 10 times from −40° C. to +60° C. with a residence time of one hour at each upper and lower temperature with a total of three hours for each cycle. The cable is severed, the severed end of a three foot long section is exposed to water under a hydrostatic pressure of three feet of water. No water leakage from the opposite end occurred after 24 hours.

What is claimed is:

1. A multiple layer adhesive film suitably employed to provide adhesion between a metallic substrate and a vinyl chloride polymer resin, the multiple layer adhesive film comprising a metal adherent layer of a copolymer of ethylene and up to about 20 percent by weight of one or more copolymerizable carboxy containing comonomers; an intermediate layer of a copolymer of ethylene and vinyl acetate containing from about 10 percent to about 40 percent by weight polymerized vinyl acetate; and a vinyl chloride polymer adherent layer of a polymer of ethylene and carbon monoxide or a copolymer of ethylene, carbon monoxide and one or more copolymerizable ethylenically unsaturated carboxy substituted comonomers.

2. A film according to claim 1, wherein the metal adherent layer additionally comprises the reaction product of up to about 10 percent by weight of a dicarboxylic acid anhydride.

3. A film according to claim 1, wherein the vinyl chloride polymer adherent layer comprises an ethylene carbon monoxide copolymer, an ethylene-acrylic acid-carbon monoxide terpolymer or an ethylene-vinyl acetate-carbon monoxide terpolymer.

4. A film according to claim 1, wherein the vinyl chloride polymer adherent layer comprises from about 5 percent to about 20 percent polymerized carbon monoxide.

5. A communications cable having improved fire resistance comprising an outer jacket of a vinyl chloride polymer resin, a multi-layer adhesive film comprising a metal adherent layer of a copolymer of ethylene and up to about 20 percent by weight of one or more copolymerizable carboxy containing comonomers; an intermediate layer of a copolymer of ethylene and vinyl acetate containing from about 10 percent to about 40 percent by weight polymerized vinyl acetate; and a vinyl chloride polymer adherent layer of a polymer of ethylene and carbon monoxide or a copolymer of ethylene, carbon monoxide and one or more copolymerizable ethylenically unsaturdated carboxy substituted comonomers, a metallic shield and a conductor assembly, the metallic shield being wrapped circumferentially around the conductor assembly and adhered to the jacket by means of the multi-layer adhesive film.

6. A cable according to claim 5 additionally comprising a water absorbable layer disposed between the metallic shield and the conductor assembly.

7. A cable according to claim 6, wherein the water absorbable layer comprises a polymer of acrylamide.

* * * * *

UNITED STATES PATENT AND TRADEMARK OFFICE
CERTIFICATE OF CORRECTION

PATENT NO. : 4,731,504

DATED : March 15, 1988

INVENTOR(S) : Felix Achille, Daniel G. Pikula and Patricia B. Leng

It is certified that error appears in the above-identified patent and that said Letters Patent is hereby corrected as shown below:

Column 3, line 38, "an interlayer," should read --an intermediate layer,--.

Signed and Sealed this

Eighth Day of November, 1988

Attest:

DONALD J. QUIGG

Attesting Officer

Commissioner of Patents and Trademarks